July 19, 1949.   B. GELARDIN   2,476,722
HOLDING DEVICE FOR ELECTRIC DRY BATTERIES
Filed March 22, 1946
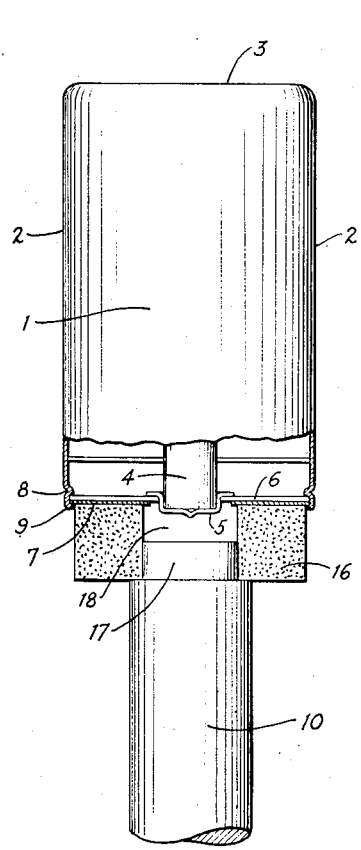
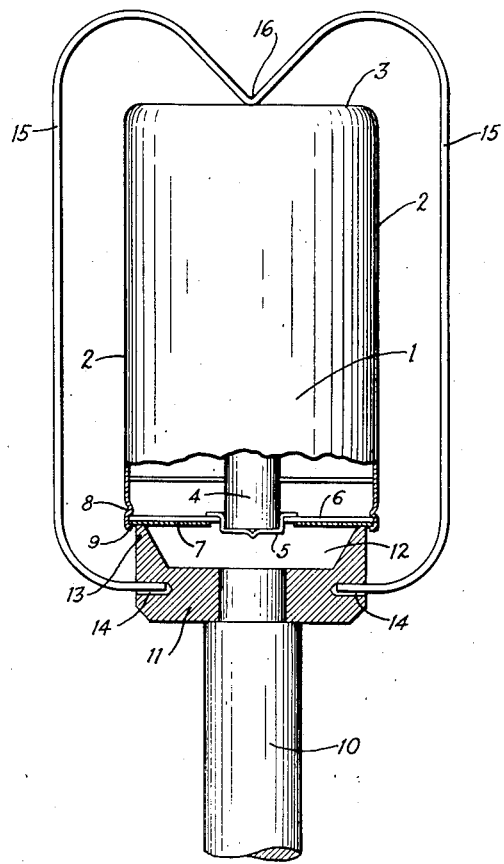
FIG. 1
FIG. 2
INVENTOR.
Benjamin Gelardin
BY H. Lee Helms
ATTORNEY Patented July 19, 1949

2,476,722

UNITED STATES PATENT OFFICE 2,476,722

HOLDING DEVICE FOR ELECTRIC DRY BATTERIES

Benjamin Gelardin, New York, N. Y.

Application March 22, 1946, Serial No. 656,220

1 Claim. (Cl. 91—60)

In my co-pending application for an Electric storage cell, Serial No. 545,595, filed July 19, 1944, now abandoned, I have described a dry electric battery spray coated with a coat of plastic composition.

The instant invention relates to a device for holding the battery during the spraying operation. Its object is to provide a holder which will expose the battery to the action of the spray with a minimum of interference by the holding implement.

A further object is to provide for the shielding of such parts of the battery as are to remain uncovered by the plastic composition because they are intended to serve as electrical contact points.

My invention will be described with reference to the drawings of which

Fig. 1 is a side elevation, partly in section, of the holding device with the battery secured to it;

Fig. 2 is a similar view of another embodiment of the invention.

The battery is of the customary type and has a cup-shaped zinc electrode which forms the outside container, generally designated 1 comprising side walls 2, a bottom wall 3 and an opening at the top. This zinc cup contains the electrolyte and a depolarizing mix (both not shown). A carbon electrode 4 which extends to or through the open end of the container serves as electrical contact. A small metallic flanged cap 5 is fitted on the carbon electrode extending above the electrolyte. Encircling the electrode cap and overlying the flange thereof to close the top of the battery container are a washer 6 made of fibre or other material and a metal disk 7. The upper edge of the zinc container of the cell is crimped over the fibre washer and the metal disk, as shown at 9, and both members are held in place between the crimped over edge and an annular notch 8 provided at the side wall of the container.

For purposes set out below the metal disk is made of steel or iron.

It should be understood that the terms "top" and "bottom" in the description of the battery refer to the battery in an upright position while, for reasons presently to be explained, the battery is shown in the drawings in inverted position.

The holding device proper consists of a tubular stem 10 which is adapted for rotation on a rotating machine of the conventional type (not shown). Adverting first to the embodiment shown in Fig. 2, it will be seen that the stem in this case is provided with a socket 11 which has a centrally recessed top face forming a pocket or cavity, which in the embodiment shown has sloping side walls. The battery is placed in inverted position on the socket so that its iron disk 7 rests on the shoulders 13 formed by the exterior walls of the pocket while the flanged cap 5 of the carbon electrode extends into the pocket. The socket has two lateral apertures 14 and secured in these are the two terminals of a loop-shaped spring member 15. The far end of the spring has an inwardly depressed V-shaped portion, the low point 16 of which is forced by the spring action against the bottom 3 of the battery. The spring member thus completely encircles the battery without touching it except at the mentioned point of contact with the bottom of the battery.

Fig. 1 illustrates a modified form of holder. This modification affords further increased protection against any kind of interference with the spraying or with the application of heat during the drying stage. The socket in this case is constituted by a permanent circular magnet 16 which rests on a shouldered top 17 of the holder stem. The stem is made of non-magnetic material and the magnet preferably is of a length extending above the end of the stem. By this arrangement, an interior well 18 is formed which affords space for the carbon electrode and cap similar to the cavity 12 in the previously discussed form. The battery in its inverted position is placed on the magnet with its iron disk plate lowermost and, in this position, is secured to the holder by magnetic attraction without requiring mechanical holding means.

In this embodiment only one of the contact areas of the battery is shielded against the insulating coat. The other contact area either may be provided by removing the plastic material from a portion of the bottom section of the battery or any suitable form of covering may be used for so much of the container surface as is desired to be kept free from the protective covering.

It will be appreciated that this form of holding device permits a completely unobstructed action of the spraying appliance excepting from such action only the top area of the battery abutting the circular magnet.

While I have shown the battery in this embodiment as provided with an iron disk covering its top face for action upon it by the circular magnet it is, of course, possible instead, to form other parts of the battery so as to make them subject to magnetic attraction.

Furthermore, while my device is primarily intended for application of the coat by spraying it may be useful also in an operation by other methods which require exposure of the battery to an outside action excluding certain parts of the battery from such action. A method of this kind, for instance, may consist in dipping the battery in a solution of a plastic composition in which case the holding device would be in an inverted position as compared with the drawings, the stem serving as a handle to hold the battery.

It stands to reason that there are other modifications possible without deviating from the scope of the invention. For instance, the stem 10 of the holder shown in Fig. 1 may be formed of magnetizable metal in which case it would have to be isolated from the permanent magnet by a stratum of non-magnetic material.

As for the bottom contact area which, in the form shown in Fig. 2, is provided by the point of abutment with the spring member 16 and, in the embodiment of Fig. 1, must be formed by removing part of the coating, it should be noted that the spraying guns may be so positioned as to leave substantially the entire bottom area or the major portion thereof blank. In that case, no shielding of the area or subsequent removal of the coat would be necessary.

What I claim and desire to secure by Letters Patent is:

A holding device for applying a coating to an electric cell, the cell having a cup-shaped container and, at one end, a protruding electrical contact member, and, surrounding this member, an iron disk, the device consisting of a shaft having a reduced end and providing an annular shoulder, a circular ring magnet of greater thickness than the length of said reduced end of the shaft, the magnet being seated on said shoulder and defining a cavity open at the top and an exterior skirt section, said magnet being adapted to secure the battery in inverted position by magnetic attraction and with the protruding electrical contact member of the battery received in the magnet cavity and shielded by the skirt of the latter.

BENJAMIN GELARDIN.

REFERENCES CITED

The following references are of record in the file of this patent:

UNITED STATES PATENTS

| Number | Name | Date |
|---|---|---|
| 647,088 | Hammond | Apr. 10, 1900 |
| 1,275,447 | Hodny et al. | Aug. 13, 1918 |
| 2,166,945 | Eberhart | July 25, 1939 |
| 2,175,745 | Darling | Oct. 10, 1939 |
| 2,369,671 | Greenberg et al. | Feb. 20, 1945 |